Patented Oct. 16, 1945

UNITED STATES PATENT OFFICE 2,386,926

SEPARATION OF AMINO ACIDS

Richard J. Block, Scarsdale, N. Y., assignor to C. M. Armstrong, Inc., a corporation of New York No Drawing. Application November 19, 1942,
Serial No. 466,217

3 Claims. (Cl. 260—529)

This invention relates to the separation of amino acids from each other and particularly to the separation of the essential polyamino acids, arginine, histidine, lysine, and tryptophane from essential monoamino acids.

It is often important to be able to add to a food composition, for example, one or more of the amino acids that are essential in animal nutrition and normally deficient in that composition, without the necessity of adding other amino acids which may be associated with the desired acid or acids when first prepared. Thus, the addition of 0.2 to 0.4% of a concentrated lysine preparation to whole wheat cereal gives to the cereal a large increase in the biological value. While the extent of the increase is not material to this invention, it is understood that the biological value of the cereal protein, as measured by the ratio of increase in weight of a test animal to the amount of protein intake, is increased to approximately 3 times the original value and the cereal protein is made almost the equivalent to beef in biological value. It will be readily appreciated, therefore, that it is beneficial to be able to separate lysine from other essential amino acids so that lysine, when called for, may be used in rather pure form, the other amino acids normally associated with the lysine to be reserved for addition to other compositions deficient in the other amino acids.

A first step in the separation of the amino acids is the separation of the polyamino acids from the monoamino. The methods now known for this separation are either long and tedious or expensive or both.

The present invention provides a simple and convenient method of separating the essential polyamino acids from the essential monoamino acids.

Briefly stated, the invention comprises forming an aqueous solution of the essential poly and essential monoamino acids that it is desired to separate into classes, the amino acids being present in substantial part at least as salts with hydrochloric or like acid, passing the solution over a cation exchange resin previously adjusted to the hydrogen cycle until the pH of the effluent, which first falls to a very low value, rises to a pH of about 2.5 to 3 or until chemical test shows polyamino acids appearing in substantial proportion in the effluent, this treatment causing the retention of the polyamino acids on the cation exchange resin and leaving the monoamino acids still in solution, separating the remaining solution from the exchanger and retained polyamino acids, and then liberating the polyamino acids from the exchanger by treatment with a moderately strong to strong acid. From the solution so obtained the polyamino acids are recovered substantially free from monoamino acids. The polyamino acids may be further separated from each other by conventional procedure for isolating the individual acids.

On the basis of previous knowledge of cation exchangers, of type used herein and after adjustment to the hydrogen cycle, these exchangers would be expected to act in the same manner with all amino acids, with no distinction between poly or mono. That this is normally the case is shown by the second and third paragraphs of Example 1 below. I have now discovered a method of so controlling the pH during contact of the exchanger with the aqueous amino acid solution that only the polyamino acids are retained and the monoamino acids as a class are substantially completely separated from the polyamino acids.

It will be understood that the amino acids that are essential (indispensable) in animal nutrition contain either one or more nitrogen containing groups and that these groups are usually amino groups ($-NH_2$). In some instances, however, a part of the nitrogen is contained in imido ($=NH$), indol, guanido or other similar groups. Regardless of the particular form of the nitrogen containing group in these amino acids, all the acids including more than one nitrogen group, as for example the diamio acids, are called polyamino, this terminology being adapted for convenience in description and because the various nitrogen groups are ordinarily the amino or relatively obviously substitution products of amino groups.

As the source of mixed essential amino acids to be separated into two classes, the polyamino and the monoamino class, there is used as raw material any solution of the two classes of amino acids, as for example, any protein hydrolysate made as described in my copending application Serial No. 446,840 for U. S. patent, filed June 12, 1942 and entitled Separation of mineral acids from amino acids. The solution should be metal free.

Examples of protein hydrolysates that provide satisfactory sources of the mixed amino acids for separation are the hydrolysates of meat scraps, casein, offal, blood meal, corn and wheat gluten, corn germ meal protein, lactalbumen, hair, various keratins and the like, the hydrolysate being suitably one made by digestion of the selected protein with an acid such as moderately dilute hydrochloric, sulfuric, hydrobromic acid, or the like, or made by enzyme hydrolysis, either with or without some of the hydrolysis being effected by means of an acid.

Regardless of the details selected for the preparation of the protein hydrolysate, it is necessary for the operation of the present separation process that the pH of the solution be controlled. Thus it is necessary that the amino acid be used in part at least in the form of a salt with a strong or moderately strong acid, for example, the hydrochloride, hydrosulfate, or hydrobromide, in the solution which is contacted with the cation exchanger. It is necessary that the solution should be at a pH not substantially above 6.5 and preferably between 3 and 6 and that the solution at the conclusion of the contact must be at a pH not substantially below 2.5 or above 3, at which pH the solution is promptly separated from the exchanger. When these conditions are observed, then the polyamino acids are retained on the exchanger and the mono acids remain in the solution which is separated from the exchanger. Particularly satisfactory yields of the retained polyamino acids are obtained when the pH of the last of the solution withdrawn from contact with the exchanger, that is the solution at the conclusion of the contact, is about 3. When the pH is controlled within the limits stated, the polyamino acids are retained in proportion as high as 95% or more of the total present in the solutions used, a substantially complete removal of the monoamino acids being effected by simply drawing off the solution remaining after the contact with the exchanger and washing the exchanger with a few portions of water. If the pH at the conclusion of the contact of the amino acid solution with the cation exchanger is substantially outside the ranges stated, there is obtained an unsatisfactory separation of the poly from the monoamino acids. When the pH of the effluent is too low, both classes of amino acids are retained. When the pH is too high, neither class is retained adequately on the exchanger.

Protein hydrolysates as first made are ordinarily strongly acid. The acidity is reduced to a satisfactory level for initial contact of the solution of the hydrolysate with the cation exchanger or in other suitable manner, as by repeated evaporation and taking up of the residue with water when the strong acid is volatile, or by contact of the solution with an acid absorbing ion exchanger that does not introduce into the solution any metal and particularly any metal whose hydroxide is strongly alkaline, say, any alkali or alkaline earth metal.

The contact of the solution of the mixed amino acids with the exchanger for separation of the poly from the monoacids is brought about in any convenient manner that makes possible the proportioning of the solution to the exchanger in amount to establish the pH at the desired level as the contact is concluded. Preferably the exchanger in granular form is placed in a vertical container or tower and the solution of the mixed amino acids is passed slowly downwardly through the tower. The pH of the first of the effluent is ordinarily very low, say, 1 to 2. The pH then rises gradually until the effluent issuing from the bottom of the tower and, therefore, at the conclusion of the contact with the exchanger shows the pH specified above as that at which the final separation from the exchanger is to be made. When this point is reached, the withdrawal of the solution from the tower is interrupted, a new receiver is placed in communication with the tower and the remaining solution is withdrawn from the tower for reuse with a fresh supply of the exchanger.

The need of such interruption of the process may be determined also by testing the effluent as it issues from the bottom of the tower with a phosphotungstic acid reagent of kind used to detect the presence of substantial amounts of polyamino acids. When a small portion of the effluent first shows a precipitate with the phosphotungstic acid reagent, the pH has fallen to the allowable limit and polyamino acid has begun to come through the tower unabsorbed.

After this point is reached, the process is interrupted as described above, and the solution remaining in the tower has been separated from the exchanger, then the exchanger with retained polyamino acids is treated to liberate the retained acids. Thus the exchanger is contacted with the aqueous solution of an acid such as one of the mineral acids previously mentioned of pH that is low, say equivalent to that of aqueous hydrochloric acid solution in concentration not substantially less than 2 and suitably about 7% of actual hydrogen chloride. This contact is effected conveniently by passing the acid solution of selected kind and strength, such as the 7% hydrochloric acid solution, downwardly through the tower containing the exchanger and retained polyamino acids. The acid liberates the polyamino acids. These are then collected with the effluent from the tower along with excess of unused liberating acid such as the hydrochloric acid. After the acid has been passed through the column the column may be washed with one or two portions of water which may be added to the effluent or used in diluting hydrochloric acid to be used in effecting liberation of retained polyamino acids from the tower in a subsequent batch.

In any case, the effluent containing the polyamino acid is treated to reduce to an allowable proportion the excess of liberating acid, the exact proportion permissible varying with the purpose for which the polyamino acids are to be used. This reduction of the content of mineral acid may be effected by treatment of the effluent with an acid absorber which removes most of the liberating acid, as described in the said copending application, while leaving the amino acid in the form of a solution which may conveniently be withdrawn from the exchanger. In case the liberating acid is volatile, as for example, in the instances of the use of hydrochloric or hydrobromic acid, then the acid may be reduced to an allowable amount for most purposes by evaporation of the aqueous solution approximately to dryness in vacuo, taking up the residue with water, again evaporating as before, and repeating the cycle of steps as many times as are found to be necessary to lower the content of the liberating acid to that desired. With hydrochloric acid as the acid to be removed, two or three such evaporations are usually adequate.

After the removal of the liberating acid as described, it will be found that the solution or residue which is left contains most of the arginine, histidine and lysine present in the original hydrolysate used and present necessarily in combined form in the protein originally subjected to hydrolysis, to produce the hydrolysate.

When the original protein has been hydrolyzed with enzyme, in the absence of such concentration of acid as destroys tryptophane, tryptophane of the original protein also will be found with the other polyamino acids. In any case, there will be present in the solution or residue practically no monoamino acids.

Individual polyamino acids in the solution or residue may be separated from each other in any usual manner. For many purposes, however, the separation of the essential polyamino acids from the monoamino acids gives a product of sufficient concentration of any one or ones of the desired polyamino acids, particularly if the protein to be hydrolyzed originally is so selected as to be rich in the desired one of the polyamino acids and low in the other poly acids.

The cation exchangers which are used in effecting the separation of the essential polyamino from the essential monoamino acids under the controlled conditions of pH are those which do not introduce into the solution any substantial proportion of metal ion. The exchangers used are preferably of the synthetic organic type and must have the power of retaining cation from salt solutions and increasing the acidity of such solutions in contact with the exchanger. The exchanger before contacting the amino acids that are to be separated should first be adjusted to the hydrogen cycle, sometimes referred to as the hydrogen derivatives of the exchanger, this being brought about by contact of the exchanger with a moderately strong to strong mineral acid, such as one of the aforementioned, and then removing by washing most at least of the remaining strong acid.

Exchangers that meet the general requirements stated and that illustrate the class that is satisfactory are the phenolic formaldehyde sulfonic acid resins such as those known by trade-marks Amberlite IR 1 and IR 100, tannic acid and formaldehyde resins, and sulfonated coal. Particularly good yields and convenient operation have been obtained by use of one of the Amberlite resins referred to.

The invention will be further illustrated by detailed description in connection with the following specific examples of the practice of it.

*Example 1*

Twenty parts of commercial blood meal are hydrolyzed with 200 parts of aqueous 18% hydrochloric acid by refluxing for 20 hours. The hydrolysate is evaporated to dryness under reduced pressure. The residue is dissolved in 100 parts of water and again evaporated to dryness so that the hydrochloric acid is largely removed. The residue is then dissolved in 500 parts of hot water. To the resulting solution 5 to 10 parts of decolorizing carbon are added, followed by 10 parts of diatomaceous earth filter aid. The solution is then boiled for 20 minutes. The insoluble material is removed by filtration and the residue washed with hot water, the amount of filtrate and washings collected being about 800 parts.

This filtered amino acid solution is treated with a conventional anion exchanger that retains acid contacted with it, without introducing metal such as alkali or alkaline earth metal, say with any synthetic anion exchange resin having an acid binding part, such for example as the exchanger Amberlite IR 4, and stirred until the supernatant liquid had a pH of 6. This removes most of the remainder of the free hydrochloric acid. The liquid containing salts of the amino acids is separated from the exchanger and the exchanger washed to remove adhering solution, the separated solution including washings totaling about 900 parts. This solution is passed through a column containing an excess of synthetic cation exchange resin (Amberlite IR 1 or 100) converted to the hydrogen derivative, the rate of passage of the solution being rapid, so that, for example, the time of contact with the exchanger is about 1 to 5 minutes. When the effluent from the column shows by chemical test that any polyamino acids are coming through, the effluent is switched to a new receiver and the column is drained. The column of exchanger and retained amino acids is washed with cation free water to remove adhering liquor.

The amino acids, both poly and monoamino, are almost quantitatively adsorbed and retained on the cation exchange resin in this procedure. They are next removed by passing a 7% solution of hydrochloric acid in water through the column until testing the elutriated liquid issuing from the column shows no precipitate with phosphotungstic acid. The excess hydrochloric acid is removed from this solution by repeated concentration in vacuo and taking up in water in the same manner as described above.

The amino acid hydrochlorides are dissolved in water to form a solution of mixed poly and monoamino acids of the type with which, as the starting material, this invention is particularly concerned.

In separating the two classes of amino acids, the pH of the solution is first brought to approximately 3 to 6 by contacting the solution with an anion exchange resin such as Amberlite IR 4.

The solution of adjusted pH is then passed through a column of cation exchange resin Amberlite IR 100 adjusted to the hydrogen cycle, at such a rate that the time of contact is about 1 to 5 minutes. When the effluent comes to show a pH of about 3, the addition of the amino acid solution is stopped.

The column is then drained and washed with cation free water. The amino acids are then elutriated with 7% hydrochloric acid as given above and the solution so obtained collected in a new receiver. The excess hydrochloric acid in this desired product is removed by repeated evaporation in vacuo, water being added after each evaporation, and the evaporation repeated until the content of hydrochloric acid is reduced to the amount allowable.

*Example 2*

The procedure of Example 1 is followed except that the initial absorption of all the amino acids in the Amberlite IR 100 is omitted and only the polyamino acids are absorbed, the retention of the polyamino acids alone being effected by using a smaller proportion of the exchanger or passing the solution over the exchanger more rapidly, so that the pH of the effluent is not below about 2.5.

*Example 3*

Corn germ meal is substituted for the blood meal as the protein to be hydrolyzed initially, the procedure otherwise being as described in Example 1.

It will be understood that it is intended to cover all changes and modifications of the example of the invention herein chosen for the purpose of illustration which do not constitute departures from the spirit and scope of the invention.

What is claimed is:

1. In the separation of poly from monoamino acids, the method which comprises forming an aqueous solution of protein hydrolysate, of pH not substantially in excess of 6.5, containing mineral acid and essential polyamino and essential monoamino acids in the form of their salts with the mineral acid; passing the solution through a layer of a cation exchange resin having the property of retaining cation from salt solutions and increasing the acidity of such solutions in contact with the resin, without introducing any substantial proportion of metal ion, and that before use is adjusted to the hydrogen cycle, this passage through the resin layer giving an effluent of low pH below that of the protein hydrolysate solution used; continuing the passage of the protein hydrolysate until the effluent shows a rise in the pH to about 2.5 to 3; then draining the liquid from the resin; washing the remaining resin and adhering liquid with water; contacting the washed material including the exchange resin and retained polyamino acids with an aqueous solution of a strong acid so as to liberate the polyamino acids from the said resin; and then draining and washing the liquid from the resin.

2. In the separation of poly from monoamino acids, the method which comprises forming an aqueous solution of protein hydrolysate, of pH not substantially in excess of 6.5, containing mineral acid and essential polyamino and essential monoamino acids in the form of their salts with the mineral acid; passing the solution through a layer of a cation exchange resin having the property of retaining cation from salt solutions and increasing the acidity of such solutions in contact with the resin, without introducing any substantial proportion of metal ion, and that before use is adjusted to the hydrogen cycle, this passage through the resin layer giving an effluent of low pH below that of the protein hydrolysate solution used; continuing the passage of the protein hydrolysate until the pH of the effluent from the exchange resin rises from the said low pH and the effluent shows by test with phosphotungstic acid reagent a substantial increase in polyamino acids present; then draining the liquid from the resin; washing the remaining resin and adhering liquid with water, contacting the washed material including the exchange resin and retained polyamino acids with an aqueous solution of a strong acid so as to liberate the polyamino acids from the said resin; and then draining and washing the liquid from the resin.

3. The method described in claim 1, the exchange resin being a phenol formaldehyde sulfonic acid resin.

RICHARD J. BLOCK.